United States Patent
Webster et al.

(10) Patent No.: US 11,153,527 B1
(45) Date of Patent: Oct. 19, 2021

(54) OUTDOOR TELEVISION WEATHERPROOF COVER

(71) Applicant: Sealoc Texas, Inc., McKinney, TX (US)

(72) Inventors: Richard Franklin Webster, McKinney, TX (US); Wesley Clark Mazurek, McKinney, TX (US)

(73) Assignee: Sealoc Texas, Inc., McKinney, TX (US)

( * ) Notice: Subject to any disclaimer, the term of this patent is extended or adjusted under 35 U.S.C. 154(b) by 0 days.

(21) Appl. No.: 17/008,182

(22) Filed: Aug. 31, 2020

(51) Int. Cl.
   *H04N 5/64* (2006.01)
   *H04N 5/65* (2006.01)
   *H04N 5/645* (2006.01)
   *G06F 1/16* (2006.01)

(52) U.S. Cl.
   CPC .............. *H04N 5/64* (2013.01); *H04N 5/645* (2013.01); *H04N 5/65* (2013.01); *G06F 1/1601* (2013.01); *G06F 1/1603* (2013.01)

(58) Field of Classification Search
   CPC . H04N 5/64; H04N 5/645; H04N 5/65; G06F 1/1601; G06F 1/1603
   See application file for complete search history.

(56) References Cited

U.S. PATENT DOCUMENTS

| | | | | |
|---|---|---|---|---|
| 3,462,852 A | * | 8/1969 | Emerson | H04N 5/65 434/43 |
| 5,772,293 A | * | 6/1998 | Hughes | G06F 1/1601 312/208.3 |
| 5,841,227 A | * | 11/1998 | Terpin | G06F 1/1609 313/479 |
| 5,894,878 A | * | 4/1999 | Morgan | G06F 1/1607 160/352 |
| 6,030,088 A | * | 2/2000 | Scheinberg | G06F 1/1601 312/223.2 |
| 6,097,448 A | * | 8/2000 | Perkins | B60R 11/0229 224/275 |
| 6,209,973 B1 | * | 4/2001 | Steinberg | G06F 1/1601 312/204 |
| 6,283,299 B1 | * | 9/2001 | Lee | G06F 1/1628 206/320 |
| 6,839,227 B1 | * | 1/2005 | Correa | G06F 1/1603 248/457 |
| 7,048,245 B1 | * | 5/2006 | Voelker | G06F 1/1601 248/309.1 |

(Continued)

OTHER PUBLICATIONS

"SunPatio Outdoor Weatherproof TV Enclosure 50', Universal Screen Protector for LED, LCD, Plasma TV, Built in Remote Control Pocket, Dustproof Television Cover Fits Standard Mounts and Stands, Black", Amazon, https://www.amazon.com/dp/B07M5BV499 (Year: 2018).*

(Continued)

*Primary Examiner* — David N Werner
(74) *Attorney, Agent, or Firm* — Braxton Perrone, PLLC; Gregory Perrone; Bobby W. Braxton

(57) ABSTRACT

A weatherproof television cover of pliable material having a rear side and upper and lower flaps and at least one air vent cover. Adhesive material associated with the upper and lower flaps securely encloses and fastens the weatherproof television cover around a television and accompanying arm of various television wall mounts.

9 Claims, 12 Drawing Sheets

(56) References Cited

U.S. PATENT DOCUMENTS

| | | | |
|---|---|---|---|
| 2005/0001521 A1* | 1/2005 | Illingworth McKinnon | G06F 1/1603 312/265.3 |
| 2006/0249189 A1* | 11/2006 | Ishmael | G06F 1/1603 135/96 |
| 2007/0084621 A1* | 4/2007 | Martin | G06F 1/1603 174/97 |
| 2008/0088212 A1* | 4/2008 | Annas | A47B 81/06 312/203 |
| 2012/0068942 A1* | 3/2012 | Lauder | G06F 1/1637 345/173 |
| 2012/0099259 A1* | 4/2012 | Park | G06F 1/1601 361/679.01 |
| 2012/0243148 A1* | 9/2012 | Vadnai | G06F 1/1607 361/679.01 |
| 2013/0050940 A1* | 2/2013 | Healy, Jr. | H04N 5/64 361/692 |
| 2013/0229715 A1* | 9/2013 | Allen | G06F 1/1603 359/613 |
| 2013/0284513 A1* | 10/2013 | Oh | G06F 1/1607 174/520 |
| 2014/0036163 A1* | 2/2014 | Avent | H04N 5/64 348/842 |
| 2017/0153666 A1* | 6/2017 | Daley, III | A45F 5/00 |
| 2018/0084659 A1* | 3/2018 | Pecorino | G09F 11/08 |

OTHER PUBLICATIONS

"Outdoor TV Cover for 50 to 52 inches LCD, LED, Waterproof, Weatherproof and Dust-Proof TV Screen Protectors with Cleaning Cloth (52 inch, Camel")", Amazon, https://www.amazon.com/dp/B07YKB7P4S/ (Year: 2019).*

"Outdoor TV Cover 46, 48, 49, 50 inch—Weatherproof Protector for Flat TVs with Bottom Seal, 600D Waterproof Material. Extend Your TV Life.", Amazon, https://www.amazon.com/dp/B06X414513/ (Year: 2017).*

"Gray Outdoor Cover for 43 Inch TV", Amazon, https://www.amazon.com/dp/B019CHGPIC/ (Year: 2015).*

* cited by examiner

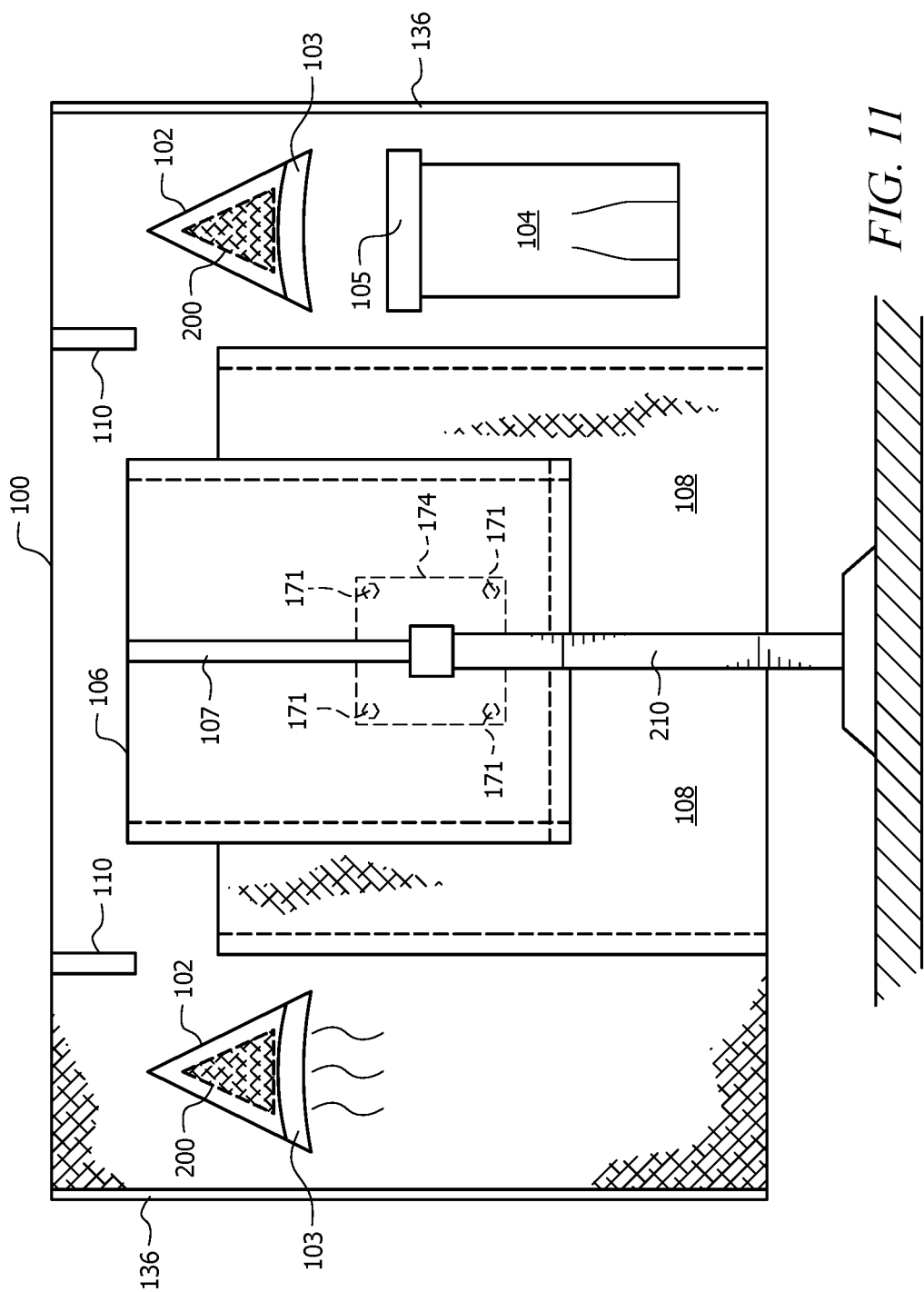

US 11,153,527 B1

OUTDOOR TELEVISION WEATHERPROOF COVER

TECHNICAL FIELD

This disclosure relates generally to the field of protection equipment for electronic devices installed and used outdoors. In particular, the disclosure relates to a weatherproof and weather resistant cover for a television set mounted and installed for outdoor use. The weatherproof cover herein described is modifiable to accommodate television mounting equipment of different types and sizes. The herein described cover also includes ventilation features that promote cooling of the television while keeping the elements, dirt and debris away from the television.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings and photographs, wherein:

FIG. 11 depicts a rear view of a weatherproof television cover in a closed position according to an embodiment of the invention.

DETAILED DESCRIPTION OF THE EMBODIMENTS

Figure 1:
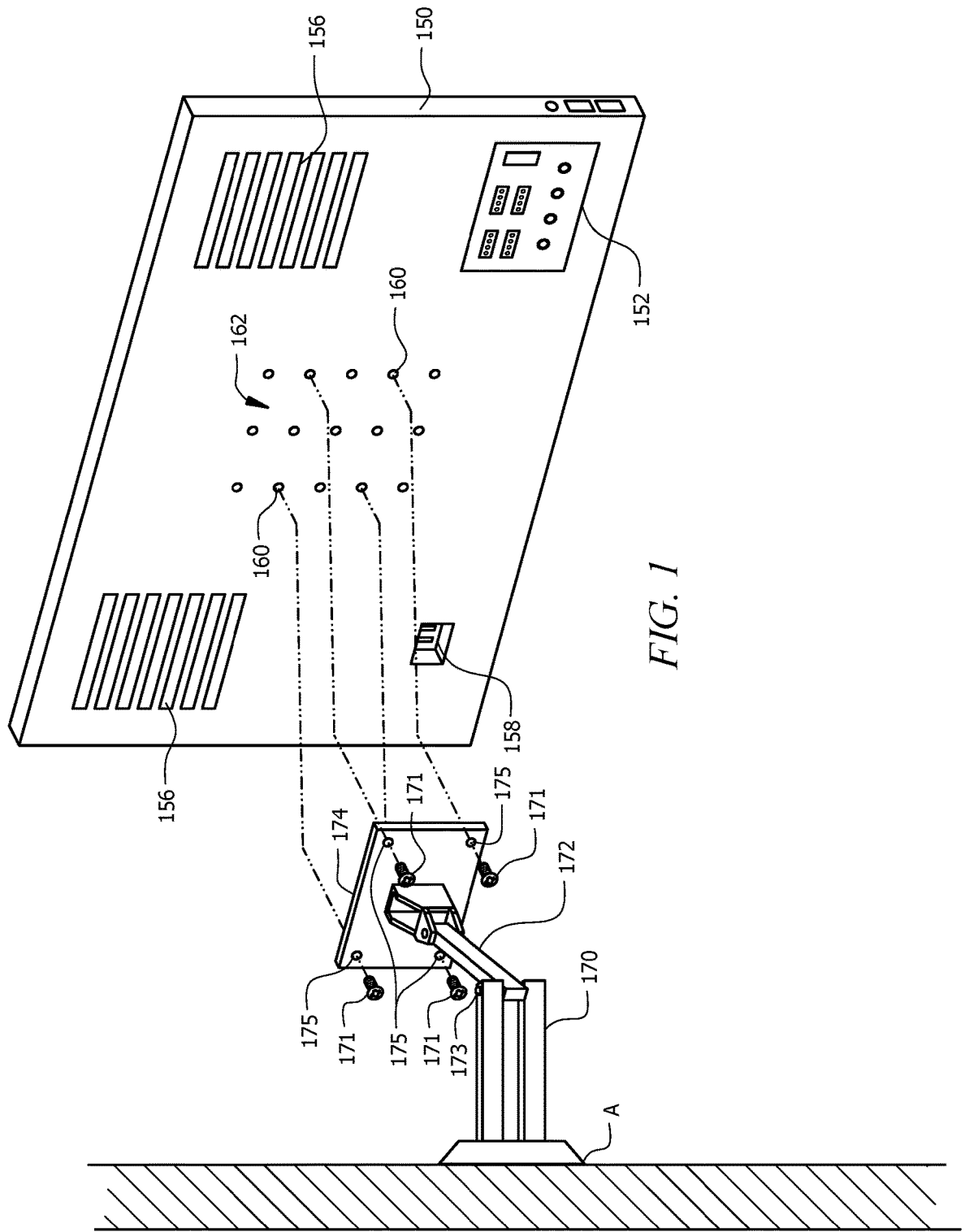
FIG. 1 depicts a perspective view of a television and mounting equipment used with an embodiment of the invention.

The detailed description set forth below is intended as a description of the present embodiments of the invention and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

The presently described invention relates to a protective weatherproof cover for an outdoor electronic product, such as a television. Consumers in the form of homeowners or commercial enterprises such as restaurants, bars, hotels and entertainment operations install one or many television sets in outdoor areas for the homeowner or customer viewing enjoyment. In some contexts, televisions are mounted outdoors in a covered porch or lanai where exposure of the television to direct sunlight, rain, wind and other debris can for the most part be prevented. In other contexts, televisions can be installed outdoors in full sun with no overhead protection, perhaps near swimming pools or in entertainment settings such as amusement parks or restaurants to provide entertainment or information. Regardless of the where the television is installed, it will be exposed to elements including sun, wind, rain, dirt, etc.

While the television itself can be weatherproofed to protect the sensitive and costly electronic and display components of the set from the elements, an additional cover is desirable to provide further protection while the set is not in use. Depending on the climate, an outdoor television might not be used for several weeks or months. Thus, a cover provides long term protection while the television is dormant.

Another issue is equipment used for mounting the television to a wall or other structure. Various mounting kits are available that can accommodate televisions of any size. Mounting units typically include a substantially flat plate that is the direct interface to the back of the television. Televisions come with pre-drilled largely universal threaded mounting holes to permit installation of the television with mounts offered by different manufacturers. Large televisions require larger mounts to accommodate more weight. Some mounts come with a movable joint to allow pivoting or rotation of the television to permit viewing of the screen from different locations. This is common in home installations where viewers may watch from different locations in a room or from another room. Other types of mounts may include simple up/down tilting mechanisms, fixed position, mounts, ceiling mounts utilizing a pole mounted to the ceiling and then to the TV, floor mounts utilizing a pole mounted to a horizontal structure such as a floor, concrete, etc. which is also/then mounted to the TV, fixed or rolling TV carts, or a combination of the aforementioned types of mounts.

Currently available covers do not accommodate mounts of different types. Some mounts come with multiple bar members that connect to the back of the television, which others only have one connection point to the television. As such, currently available covers can accommodate one type of mount but not another. This results in suppliers having to offer multiple units to accommodate even slightly different mounts. This in turn increases manufacturing costs and requires a manufacturer already competing for shelf space at "big box" retailers to determine how to make a full line of covers available in limited shelf space.

The presently described weatherproof television cover 100 can accommodate television mounts of virtually any type, including wall mounts, ceiling pole mounts, floor pole mounts and the like, as discussed herein. The presently described television cover resolves these issues by providing a universal cover that accommodates mounts of any type. Multi-tiered flaps provided on the rear face of the cover fasten around mounting members of various size and location to provide a snug fit to keep out rain, dirt, salt, sunlight, etc. The universal cover presently described prolongs the life of televisions used outdoors and provides consumers with "one type fits all" product that the user can re-use even if a different television having a different mount is installed.

FIG. 1 depicts a perspective view of a television and mounting equipment used with an embodiment of the invention. In FIG. 1, television 150 is shown from the rear. The rear of television 150 incudes various panels and areas that include ventilation or outlet ports or receptacles for connection of peripheral devices and a power cord. Specifically, rear of television 150 includes peripheral connection ports 152 that includes ports for connecting audio cables, HDMI cables, coaxial cables and the like. As shown in FIG. 1, the peripheral connection ports 152 are directly open at the back of television 150. Peripheral connection ports 152 can include appropriately sized and located slots to permit cords plugged into peripheral connection ports 152 to be installed and used as intended.

Continuing, ventilation areas 156 can be located at each side of the back television 150. Ventilation areas 156 permit heat to escape from the carcass of television 150 to protect overheating of television electronics. Ventilation areas 156 comprise slits or holes manufactured in the carcass of television 150 to permit air escape and air flow. The rear of television 150 also includes a power cord port 158 for connection of the television power cord.

It is contemplated that the various embodiments of the presently described weatherproof television cover are for use with standard televisions. Different sizes of the described weatherproof television cover can be made available to accommodate televisions of various sizes or multiple televisions installed in a mosaic pattern. The described weatherproof television cover can also accommodate a television that as a whole or some of its components are weatherproofed for outdoor use. That is, the underlying television can be treated with weatherproof materials or compounds or enhanced with additional hardware or fixtures to make the television itself weatherproof. By example, various aspects of the television can be treated with weatherproofing solutions to make the television moisture and debris resistant. Similarly, hardware can be placed over factory installed television air vents to further prevent debris and water from entering the carcass of the television.

For these and other types of weatherproofing measures made to the television, the various embodiments of the presently described weatherproof television cover can be installed as a layer of protection from weather and the elements just as it is on a standard off-the-shelf television. Regardless of the underlying television and the enhancements to it, the presently described weatherproof television cover operates to provide an outer layer of protective covering when used with various television mounting systems or even is placed on a flat counter-type surface unmounted.

Continuing with FIG. 1, the rear of television 150 can include a series of threaded holes 160. Threaded holes 160 are configured and sized to receive bolts 171 or other fasteners that accompany television mount 170. Television mount 170 can include a pivoting arm 172 having joint 173 that permits various ranges of motion to adjust the position of television 150. The mounting apparatus for the television can be a wall mounted unit, as shown, or a pole mounted unit or a ceiling mounted unit. The presently described weatherproof television cover 100 and its layers of securable flaps can accommodate various mounting unit types.

Attached to pivoting arm 172 is mount plate 174 having a plurality of mount holes 175. Mount holes 175 are arranged to accommodate several models of common televisions. Mount plate 174 is the interface between back section 162 of television 150 and television mount 170. By inserting bolts 171 through mount holes 175 and then into holes 160, mount plate 174 joins television 150 at back section 162 in a secure manner. With television mount 170 securely mounted to a wall or other surface at point A, television 150 is finally installed for viewing.

Figure 2:
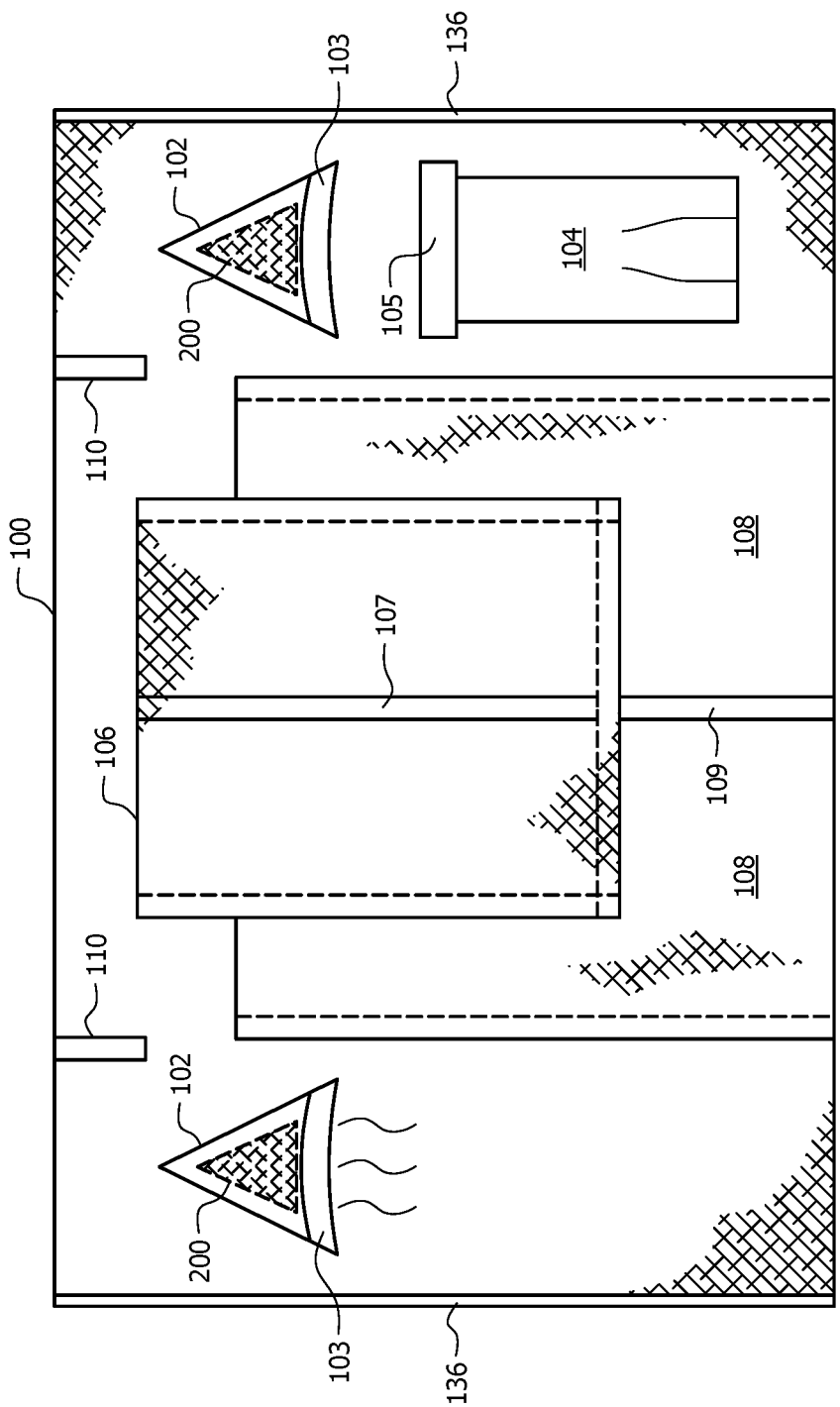
FIG. 2 depicts a rear view of a weatherproof television cover in a closed position according to an embodiment of the invention.

FIG. 2 depicts a rear view of a weatherproof television cover in a closed position according to an embodiment of the invention. In FIG. 2, the back of weatherproof television cover 100 includes at least one vented tent 102. As shown, a vent tent 102 is situated in association with underlying mesh vent 200. One or more of vent tent 102 and underlying mesh vent 200 can be located in association with typical ventilation areas 156 located on the back of television 150. As shown in FIG. 2, vent tents 102 are located on the left and right side of the back side of weatherproof television cover 100. The tented design of vent tent 102 includes a rigid strip 103 of plastic or metal located at the bottom end of vent tent 102. Rigid strip 103 can be sewn into the bottom hem of vent tent 102. Rigid strip 103 permits vent tent to stand off from the back side main body material of weatherproof television cover 100. In this manner vent tent 102 remains open at the bottom side of vent tent to permit hot air to escape from ventilation area 156, preventing television 150 from overheating.

Continuing with FIG. 2, weatherproof television cover 100 on the back side includes upper flaps 106 and lower flaps 108. Upper flaps 106 in one embodiment comprise two halves or sides that join in the middle and connect by upper flap center adhesive strip 107 such as hook and loop material. This permits upper flaps 106 to be opened during television covering and removal. Similarly, lower flaps 108 in one embodiment comprise two halves or sides that join in the middle and connect by an adhesive strip 109 such as hook and loop material. This permits lower flaps 108 to be opened during television covering and removal. When upper flaps 106 are opened, a first opening in the back of weatherproof television cover 100 results. When lower flaps 108 are opened, a second opening in the back of weatherproof television cover 100 results.

Also on the back of weatherproof television cover 100 is accessory holder 104. Accessory holder 104 includes top flap 105 that keeps accessory holder closed but allows heat to escape and prevents moisture buildup within accessory holder 104. Accessory holder 104 can house remote controls of various sizes and type. An appropriate fastener, such as hook and loop material, a snap, a button, a zipper or the like can be added to provide better closure of top flap 105 to accessory holder 104. Storage strips 110 are located along a top edge of the back of weatherproof television cover 100. Storage strips 110 in one embodiment comprise hook and loop material and can be used for strapping closed a rolled weatherproof television cover 100 when not in use.

Figure 2A:
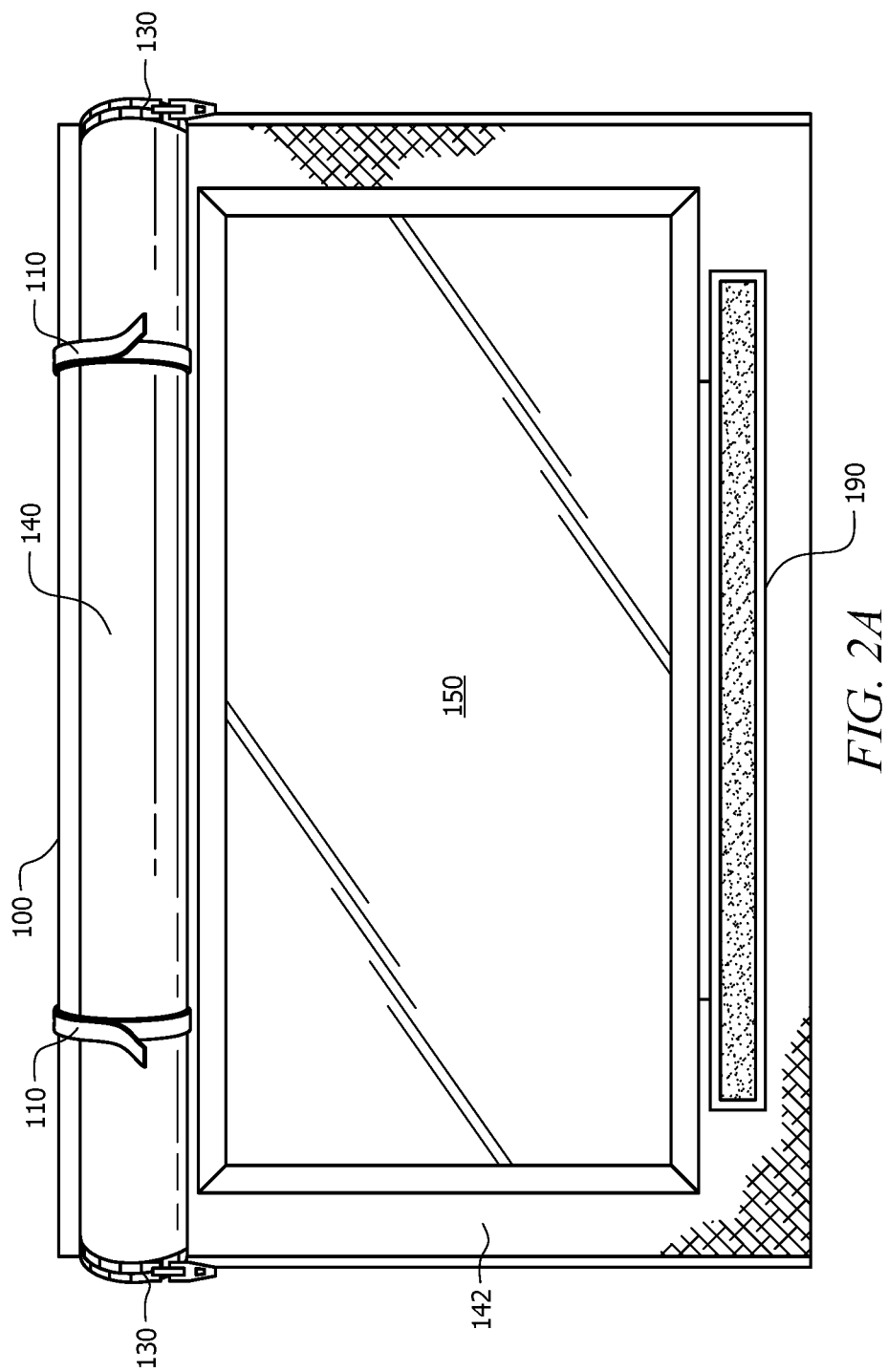
FIG. 2A depicts a perspective view of a weatherproof television cover on a television during television viewing according to an embodiment of the invention.

FIG. 2A depicts a perspective view of a weatherproof television cover on a television during television viewing according to an embodiment of the invention. In FIG. 2A, television 150 has weatherproof television cover 100 installed but rolled up to permit television viewing. As shown, interior front side 140 of weatherproof television cover 100 is rolled up and above the screen of television 150 to permit viewing. In the process, zippers 130 on each side of weatherproof television cover 100 are unzipped and interior front side 140 is rolled up and secured above the screen with the pair of storage strips 110, which in one embodiment are hook and loop material. In the meantime, interior back side 142 remains in place covering the back of television 150, even when viewing.

Figure 3:
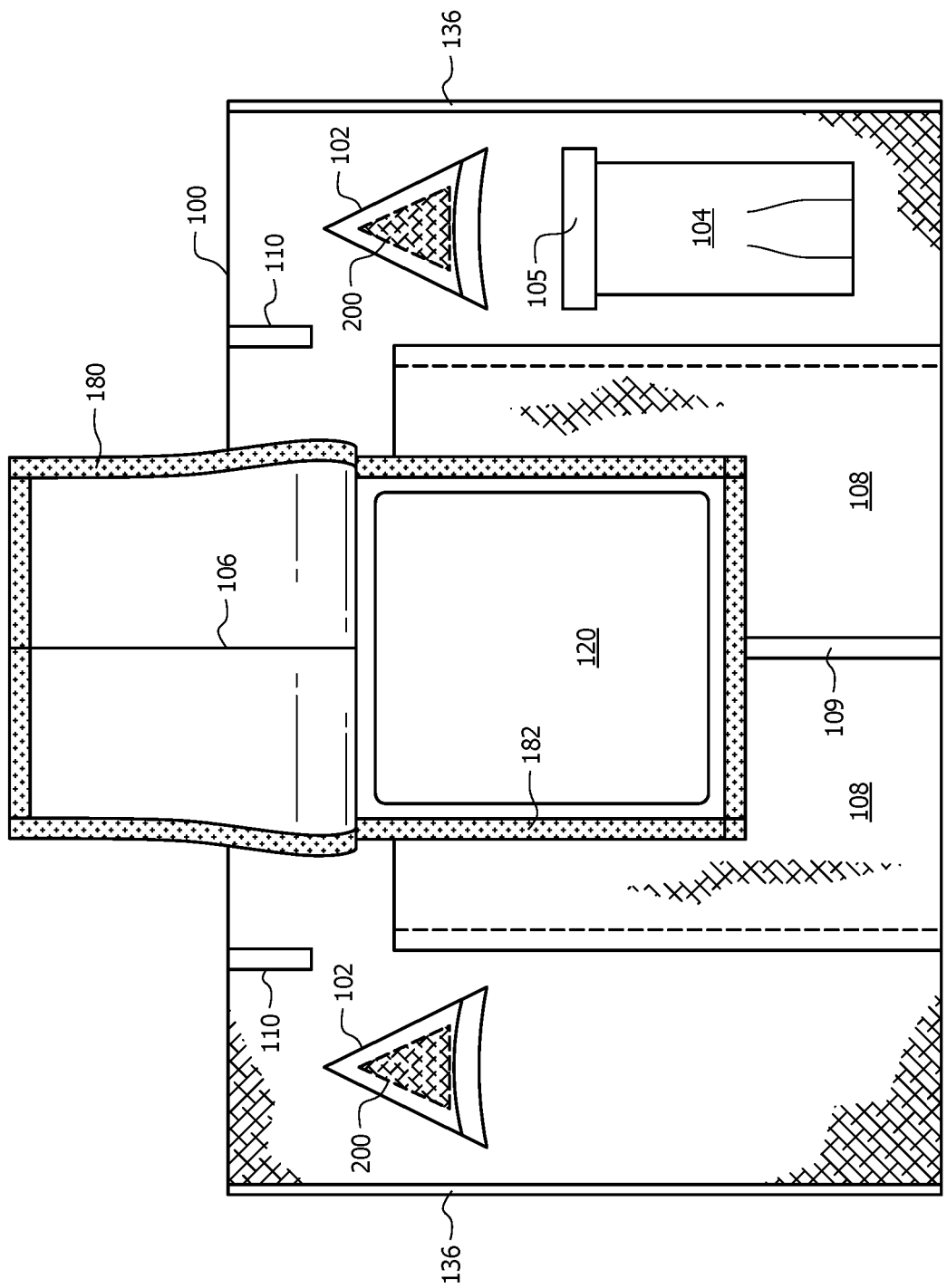
FIG. 3 depicts a rear view of a weatherproof television cover in a partially open position according to an embodiment of the invention.

FIG. 3 depicts a rear view of a weatherproof television cover in a partially open position according to an embodiment of the invention. FIG. 3 depicts the same elements disposed on the back side of weatherproof television cover 100. In this depiction, however, upper flaps 106 are opened. Upper flaps 106 are able to be moved to an open position as shown by separating upper flap upper fastening border 180 from upper flap lower fastening border 182, which can be made of suitable material such as hook and loop material. By separating and raising upper flaps 106 as shown, opening 120 results with the inner side of the front of weatherproof television cover 100 showing. Opening 120 makes weatherproof television cover 100 ready to be installed over a correspondingly sized television mounted with a correspondingly sized mounting bracket. Note that at this juncture, only upper flaps 106 are in the open position while lower flaps 108 remain closed.

Figure 4:
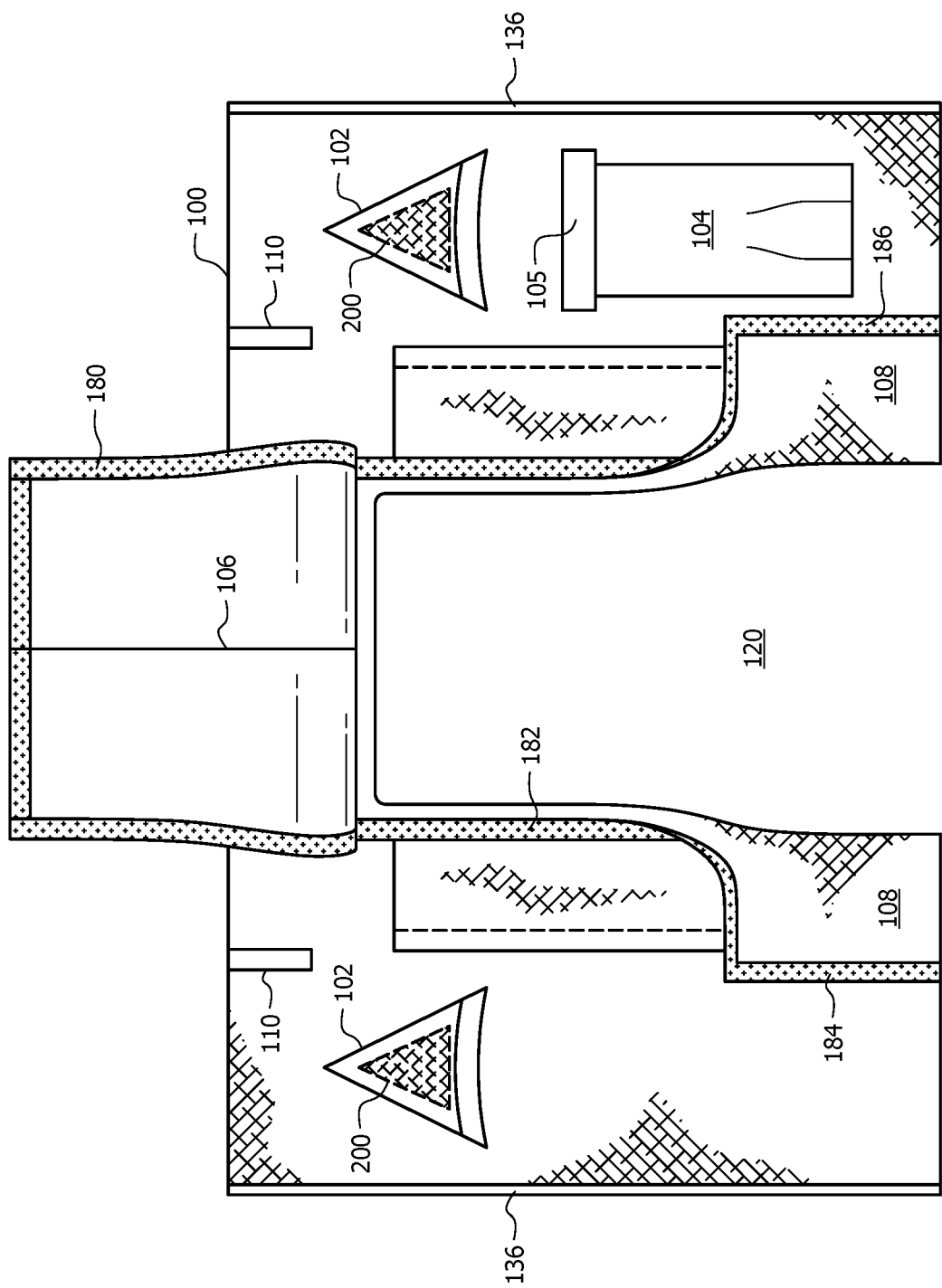
FIG. 4 depicts a rear view of a weatherproof television cover in a partially closed position according to an embodiment of the invention.

FIG. 4 depicts a rear view of a weatherproof television cover in a partially open position according to an embodiment of the invention. FIG. 4 includes the components depicted in FIGS. 2 and 3, with upper flaps 106 remaining in the open position as discussed with respect to FIG. 3. In FIG. 4, lower flaps 108 are opened in a lateral manner much like a book is opened. As shown, the pair of flaps of lower flaps 108 are opening by detaching lower flap left fastening border 184 from lower flap right fastening border 186. Each of lower flap left fastening border 184 and lower flap right fastening border 186 can comprise suitable fastening material such as hook and loop material.

As shown, when lower flaps 108 are in the open position in conjunction with open upper flaps 106 a large opening 120 results with more of the inner face of weatherproof television cover 100 exposed. Typically, television 150 is mounted to a mounting device such as those herein described and the upper flaps 106 and lower flaps 108 of weatherproof television cover 100 are opened and cover 100 is slip in place over the top of television 150. Upper flaps 106 and lower flaps 108 of weatherproof television cover 100 are then closed and secured about television 150 and the arm of the mount that contacts interfaces with mounting plate 174 installed at the back of television 150. The two layer configuration of upper flaps 106 and lower flaps 108 provide a secure enclosure at the back of television 150 and allow weatherproof television cover 100 to fit snuggly around television mounts of various sizes and configuration.

In addition, upper flap center adhesive strip 107 and lower flap left fastening border 184 and lower flap right fastening border 186 are partially closable junctions that permit the mount pivoting arm 172 to pass through weatherproof television cover 100. The hook and loop or other material in combination with the layers formed by upper flaps 106 and lower flaps 108 provide a secure and weatherproof fit around mount pivoting arms 172 and mounting plates 174 of any configuration.

Figure 5:
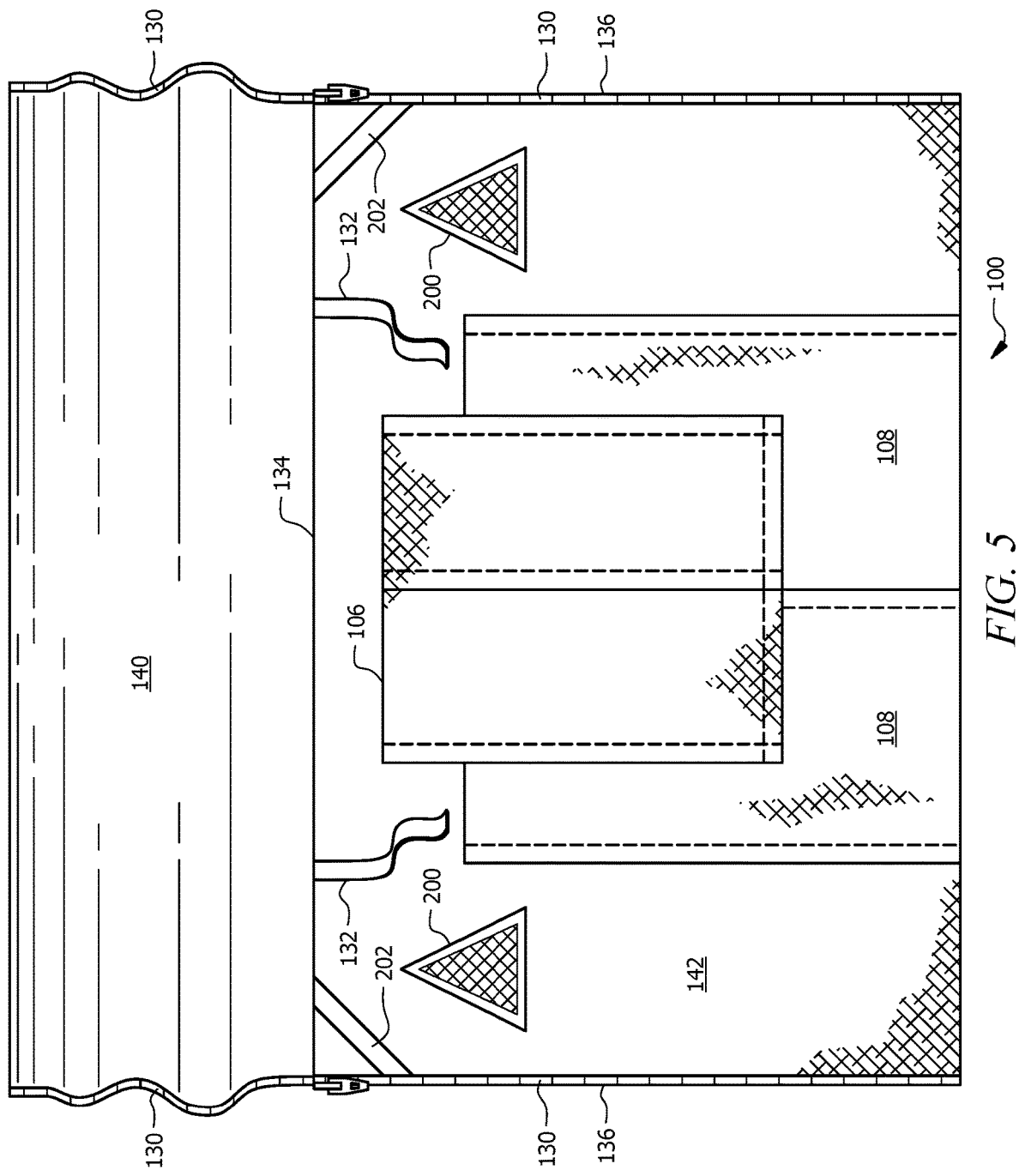
FIG. 5 depicts a perspective of a weatherproof television cover in an open position according to an embodiment of the invention.

FIG. 5 depicts a perspective of a weatherproof television cover in an open position according to an embodiment of the invention. In FIG. 5 interior front side 140 of weatherproof television cover 100 is separated from the back side of weatherproof television cover 100 with interior back side 142 and interior front side 140 showing. Interior back side 142 is the opposite side as the exterior back side of weatherproof television cover 100 shown in FIGS. 2-4. From this view, mesh vents 200 are visible as are the interior sides of upper flaps 106 and lower flaps 108. In one embodiment, the upper half of weatherproof television cover 100 and the lower half of weatherproof television cover 100 are joinable on three sides. Upper half of weatherproof television cover 100 and lower half of weatherproof television cover 100 can be joined on a top horizontal edge 134 by stitching or adhesive. Conversely, the upper half and lower half can be removably joined along the top horizontal edge by a zipper, snaps, hook and loop material or the like.

Similarly, side edges 136 can be removably attached by a zipper 130 or other suitable joinery materials such as snaps, hook and loop material or the like. Lower edges remain open to permit air flow to television 150 when not in use to prevent condensation, mold, etc., particularly in humid climates. In one embodiment, the height of weatherproof television cover 100 is several inches longer than the height of television 150 to accommodate accessories or devices below the television screen, such as an audio sound bar, advertising or informational signage or the like.

Continuing with FIG. 5, a pair of corner straps 202 are situated at the interior upper corners of the interior back side 142 of weatherproof television cover 100. Each corner strap 202 is so located to prevent weatherproof television cover 100 from sliding off of the television due to wind or otherwise. Corner straps 202 also secure weatherproof television cover 100 when the television is in use and weatherproof television cover 100 is rolled up to enable television viewing. Each corner strap 202 can be elasticized to provide a snug fit about the corner of the television. Alternatively, corner strap can include a strap for tightening or loosening or one or more snap fasteners for adjustability.

Staying with FIG. 5, in one embodiment securing strips 132 are sewn or otherwise fastened to various locations within interior back side 142 of weatherproof television cover 100. Securing strips 132 are fasteners made of various materials including hook and loop material, snaps, buttons or the like. Securing strips 132 connect to a corresponding fastener on the back of television 150. When hook and loop material is used for securing strip 132, a corresponding piece of hook and loop material is placed at a location on the back of television 150 to receive each of securing strip 132. Securing strips 132 serve to keep weatherproof television cover 100 in place to prevent movement or removal due to high winds. If other fastener means are employed, a suitable snap or button hole can be situated at the necessary location on the back of television 150 to align with securing strips 132. In one embodiment, securing strips 132 are placed at or near the upper corners of the back of television 150 and in addition at the lower corners at the back of television 150.

Figure 6:
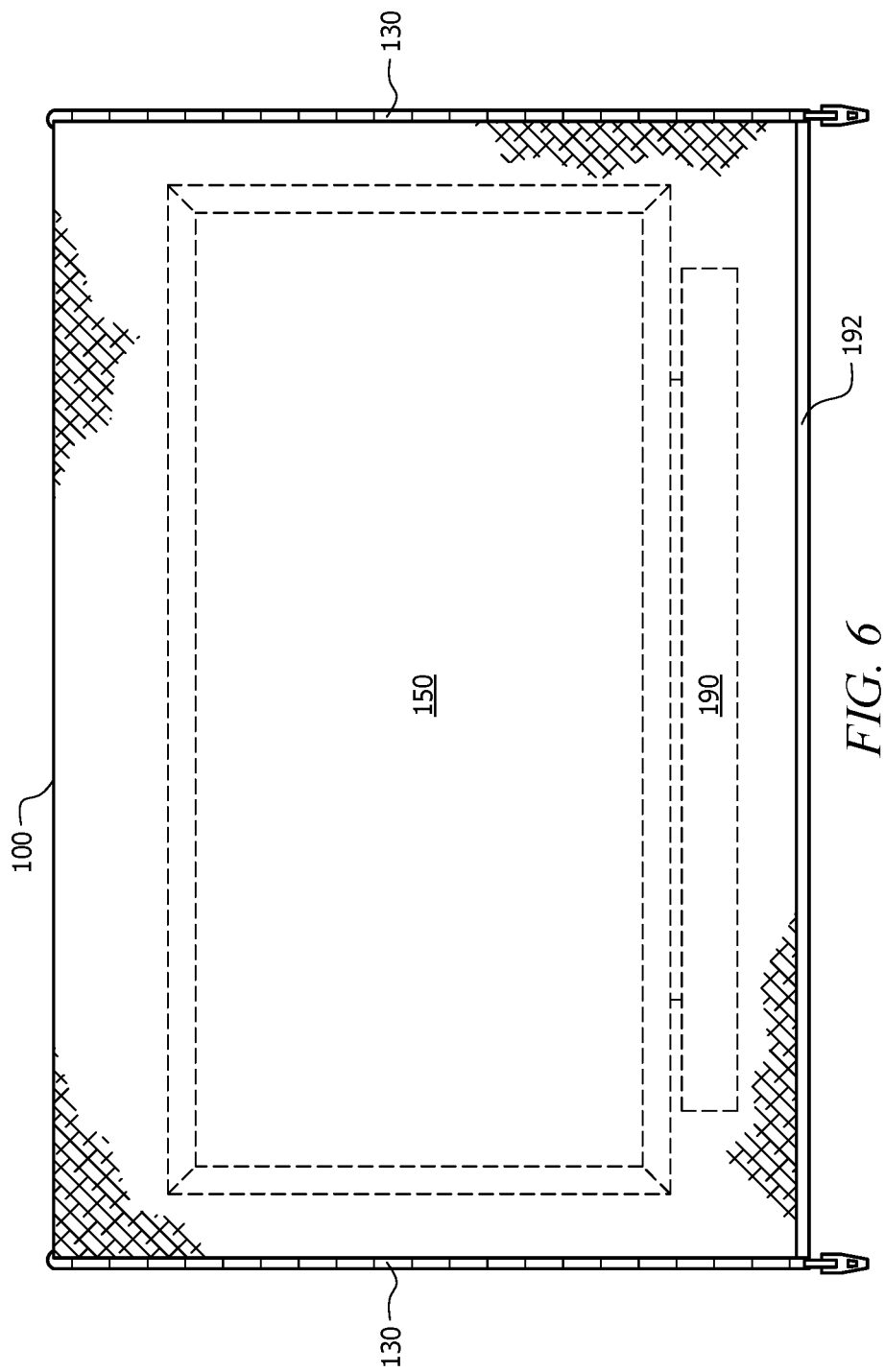
FIG. 6 depicts a front view of a weatherproof television cover in a closed position according to an embodiment of the invention.

FIG. 6 depicts a front view of a weatherproof television cover in a closed position according to an embodiment of the invention. In FIG. 6, a fully closed weatherproof television cover 100 is shown. Television 150 resides within weatherproof television cover 100, which is shown with dashed lines as it is not visible. The height of weatherproof television cover 100 is extended, which permits coverage of equipment below television 150 such as soundbar 190 or the like. Weatherproof television cover 100 is closed on the side edges by zippers 130. In this configuration, when weatherproof television cover 100 is installed on television 150 and flaps are in the closed position, weatherproof television cover 100 snugly secures and protects.

Optionally, at the bottom of the front side of weatherproof television cover 100 is slot 192. Slot 192 can include an opening at either end to receive a pole sized according to the width of weatherproof television cover 100. The pole can be made of a variety of materials, such as metal, plastic, fiberglass or the like and can be a tension-type pole that can be detached and folded compactness or in a single piece. The pole can be pre-installed by the manufacture or be made available to the user for insertion and removal by the user as needed. The pole is offered to provide additional stability and weight to weatherproof television cover 100, which in turn, provides better protection of the television from the elements. Slot 192 can be open from the ends or open and closed from the top down or bottom up, with appropriate fasteners, such as hook and loop material, snaps, buttons, zippers or the like providing closure.

Figure 7:
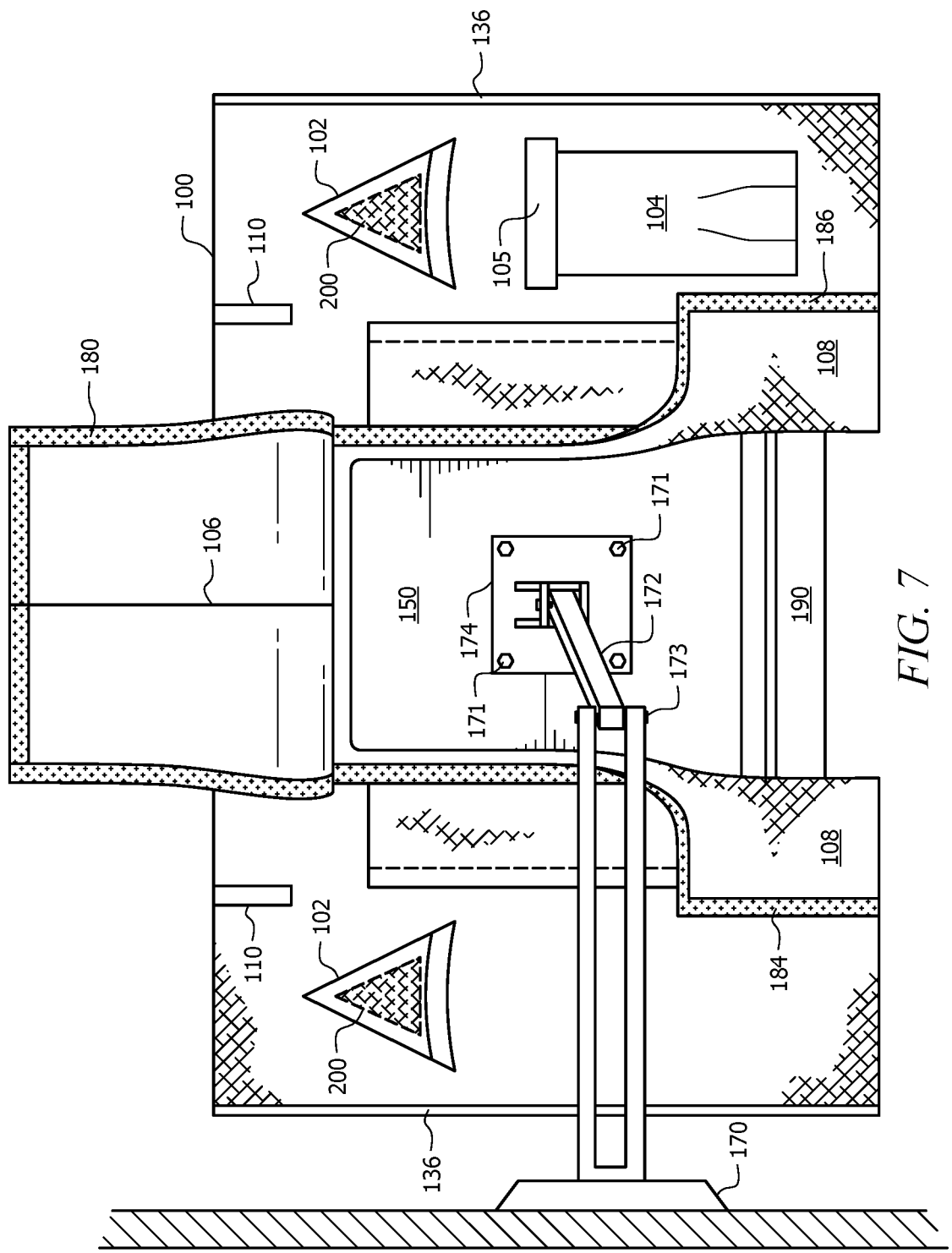
FIG. 7 depicts a rear view of a weatherproof television cover in an open position according to an embodiment of the invention.

FIG. 7 depicts a perspective of a weatherproof television cover 100 in an open position according to an embodiment of the invention. In FIG. 7, weatherproof television cover 100 is positioned on television 150 (shown from rear) that is mounted to a wall with television mount 170. Mounting plate 174 is installed on the back of television 150 as discussed above with bolts 171 that mate with threaded holes 160 pre-drilled in the back of television 150. As shown in FIG. 7, upper flaps 106 and lower flaps 108 are in an open position to permit placement of weatherproof television cover 100 over television 150.

Figure 8:
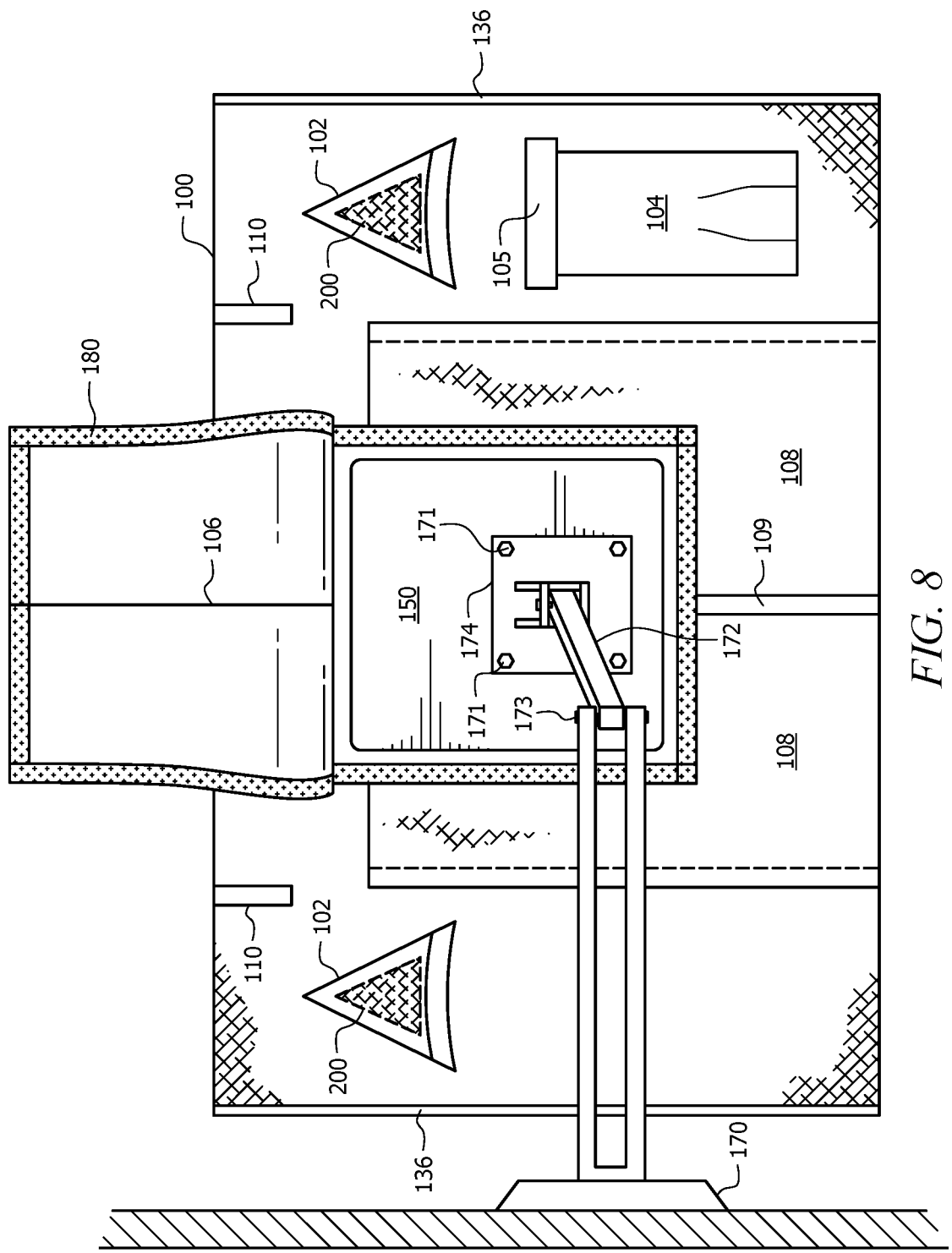
FIG. 8 depicts a rear view of a weatherproof television cover in a partially closed position according to an embodiment of the invention.

FIG. 8 depicts a perspective of a weatherproof television cover in a partially closed position according to an embodiment of the invention. FIG. 8 depicts the next phase of the process of placing weatherproof television cover 100 on television 150. In FIG. 8, lower flaps 108 are closed and each side of lower flaps 108 are secured together by lower flap centered adhesive strip 109 centered between flaps 108. Note that upper flaps 106 remain in the open position, leaving mount plate 174 exposed. This joinder of the left and the right of lower flaps 108 securely encloses the lower portion of the rear of television 150.

Figure 9:
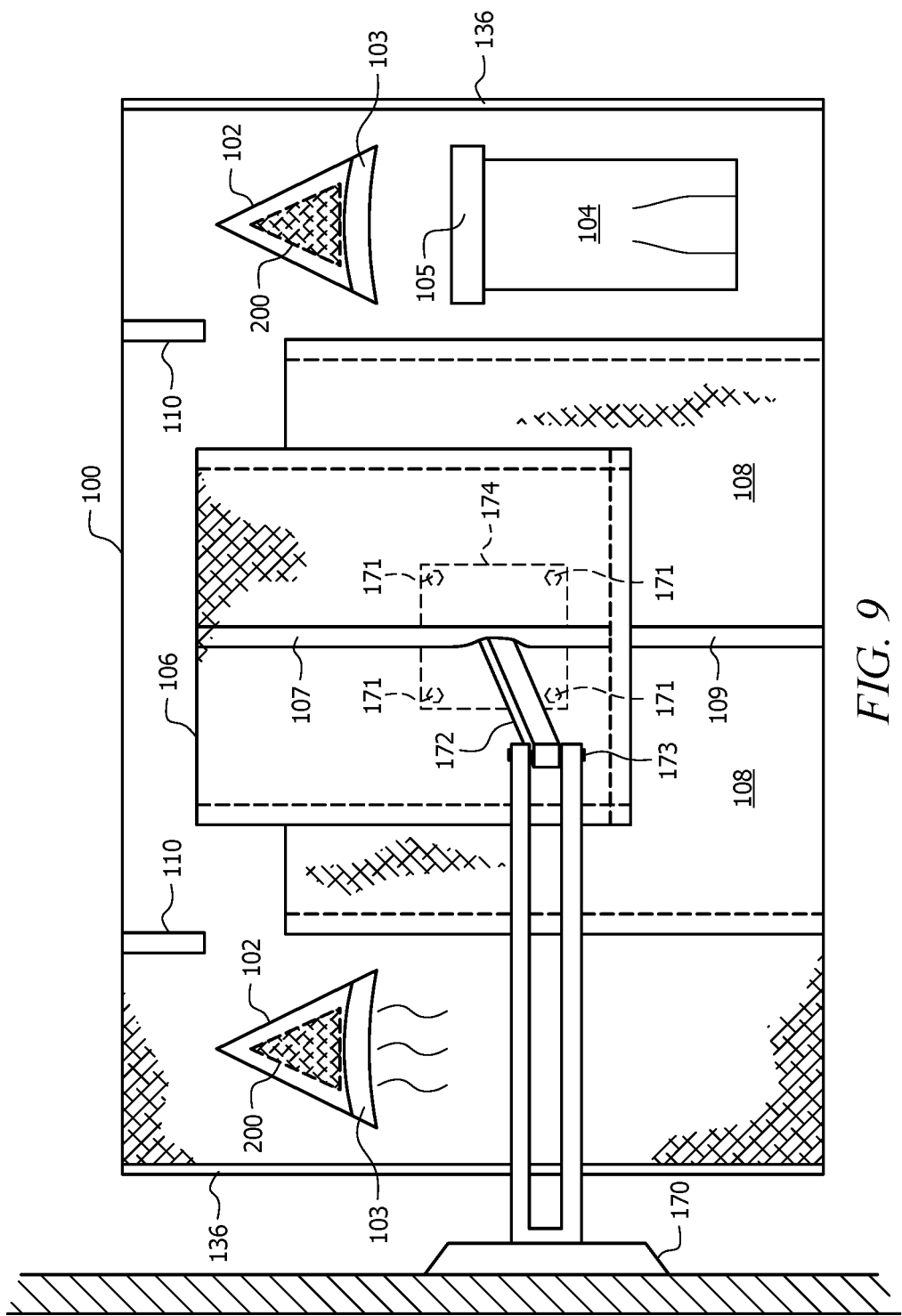
FIG. 9 depicts a rear view of a weatherproof television cover in a closed position according to an embodiment of the invention.

FIG. 9 depicts a perspective of a weatherproof television cover in a closed position according to an embodiment of the invention. FIG. 9 depicts the next phase of the process of placing weatherproof television cover 100 on television 150. In FIG. 9, each of the upper flaps 106 are closed to cover mount plate 174. Each side of upper flaps 108 is secured together by upper flap center adhesive strip 107. The connection of each side of upper flap 108 securely places mounting plate 174 inside of weatherproof television cover 100. The upper flap center adhesive strip 107 enables a tight fit around pivoting arm 172 and mounting plate 174 (shown in dashed lines as obscured from view). In this fully closed position of weatherproof television cover 100 closed upper flaps 106 overlap sections of closed lower flaps 108 to provide additional protection to television 150, keeping out the elements.

In some embodiments, weatherproof television cover 100 is constructed of light-colored material that helps shed or deflect ultraviolet rays and infrared heat from away from television 150. Weatherproof television cover 100 can be longer in length than necessary to cover a television in order to adequately cover a television equipped with a sound bar attached above or below the television. Weatherproof television cover 100 can be constructed of "rip-stop" material to prevent expansion of a small hole or tear into a larger hole in the material.

Figure 10:
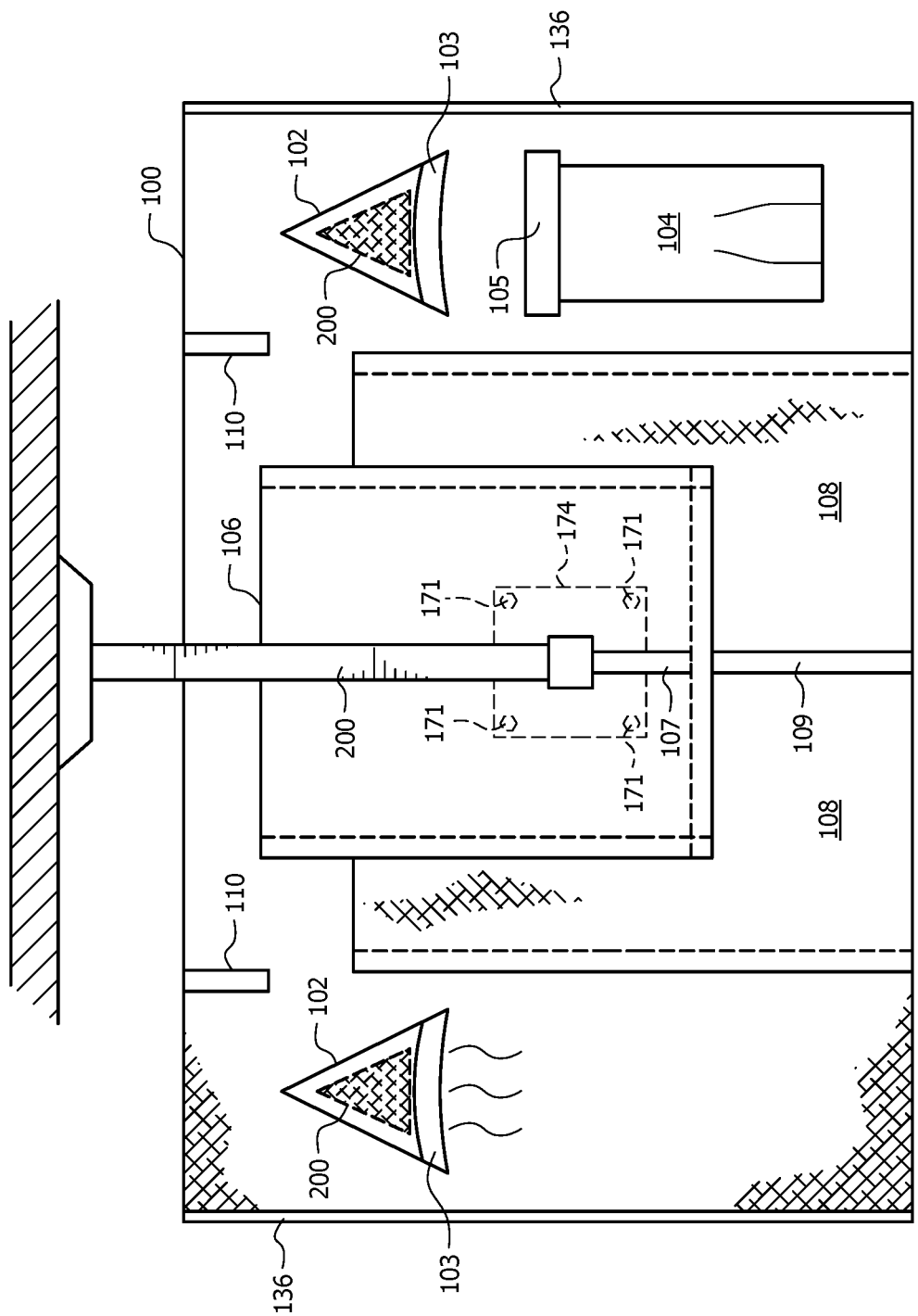
FIG. 10 depicts a rear view of a weatherproof television cover in a closed position according to an embodiment of the invention.

The presently described weatherproof television cover accommodates mounting systems of various types. Previously discussed were wall mounted television brackets. FIGS. 10 and 11 depict alternative mounting systems for televisions covered by the presently described weatherproof television cover 100. In FIG. 10, ceiling pole mount 200 is connected to mount plate 174. A distal end of ceiling pole mount 200 is connected to the ceiling or other overhead support structure such as a beam or joist. The other components of weatherproof television cover 100 are shown as in the previous figures. Here, upper flaps 106 and lower flaps 108 are in a closed position, covering the back of the television and snugly fitting around ceiling pole mount 200.

Similarly, in FIG. 11, floor pole mount 210 is connected to mount plate 174. A distal end of floor pole mount 210 is connected to the floor or other support structure beneath the television. The other components of weatherproof television cover 100 are shown as in the previous figures. Here, upper flaps 106 and lower flaps 108 are in a closed position, covering the back of the television and snugly fitting around floor pole mount 210.

While the invention has been particularly shown and described with reference to a preferred embodiment, it will be understood by those skilled in the art that various changes in form and detail can be made therein without departing from the spirit and scope of the invention.

What is claimed is:

1. An electronic equipment cover, comprising:
    a front side and a back side;
    the back side comprising:
        a ventilation section;
        a tapered cover disposed above the ventilation section;
        a rigid member disposed within a lower end of the tapered cover;
        an upper layer on the back side having at least two flaps connectable to each other;
        a lower layer on the back side having at least two flaps connectable to each other; and
        a connecting strip disposed between the at least two flaps of the upper layer for securing the electronic equipment cover to an electronic equipment mounting device,
        wherein a portion of the at least two flaps of the upper layer connected to each other overlap at least a portion of the at least two flaps of the lower layer connected to each other.

2. The electronic equipment cover of claim 1, wherein the electronic equipment is a television.

3. The electronic equipment cover of claim 1, further comprising a covered housing for an electronic equipment controller.

4. The electronic equipment cover of claim 1, further comprising a fastener along a first edge of the cover and a second edge of the cover for securing the front side of the cover to the back side of the cover.

5. The electronic equipment cover of claim 1, wherein the cover is constructed of ultraviolet light reflecting material.

6. The electronic equipment cover of claim 1, wherein the cover is constructed of heat reflecting material.

7. The electronic equipment cover of claim 1, further comprising a hook and loop material strip for connecting the at least two flaps of the upper layer to each other.

8. The electronic equipment cover of claim 1, further comprising a hook and loop material strip for connecting the at least two flaps of the lower layer to each other.

9. The electronic equipment cover of claim 1, wherein the ventilation section comprises a mesh vent.

\* \* \* \* \*